United States Patent [19]

Foerstner

[11] 4,190,756
[45] Feb. 26, 1980

[54] DIGITALLY PROGRAMMED MICROWAVE COOKER

[75] Inventor: Richard A. Foerstner, Iowa City, Iowa

[73] Assignee: Amana Refrigeration, Inc., Amana, Iowa

[21] Appl. No.: 872,531

[22] Filed: Jan. 26, 1978

Related U.S. Application Data

[63] Continuation of Ser. No. 671,468, Mar. 29, 1976, abandoned.

[51] Int. Cl.² .............................................. H05B 9/06
[52] U.S. Cl. .............................. 219/10.55 B; 323/24; 323/34
[58] Field of Search ................ 219/10.55 B, 10.55 M, 219/10.55 R, 506, 494; 323/20, 24, 34; 328/158, 159; 34/4, 39

[56] References Cited

U.S. PATENT DOCUMENTS

| | | | |
|---|---|---|---|
| 3,846,607 | 11/1974 | Bucksbaum | 219/10.55 B |
| 3,886,539 | 5/1975 | Gould, Jr. | 307/116 X |
| 3,932,723 | 1/1976 | Tamano et al. | 219/10.55 B |
| 3,988,577 | 10/1976 | Leitner et al. | 219/506 |
| 4,001,536 | 1/1977 | Eberhardt, Jr. | 219/10.55 B |

Primary Examiner—Arthur T. Grimley
Attorney, Agent, or Firm—M. D. Bartlett; J. D. Pannone; H. W. Arnold

[57] ABSTRACT

A microwave cooker digitally programmed in any of a plurality of different cycles whose digital programs are selected from a front panel display. Programs include a cook cycle, a defrost cycle, and/or a defrost and cook cycle, in which a body of refrigerated food to be heated is subjected to microwave energy for a predetermined time in the oven, and then allowed to set for a predetermined time to allow heat produced in the food body by said microwave energy to at least partially disperse throughout the body thereby equalizing the temperature of different food body regions and then applying additional microwave energy for a predetermined time to cook said food body.

6 Claims, 6 Drawing Figures

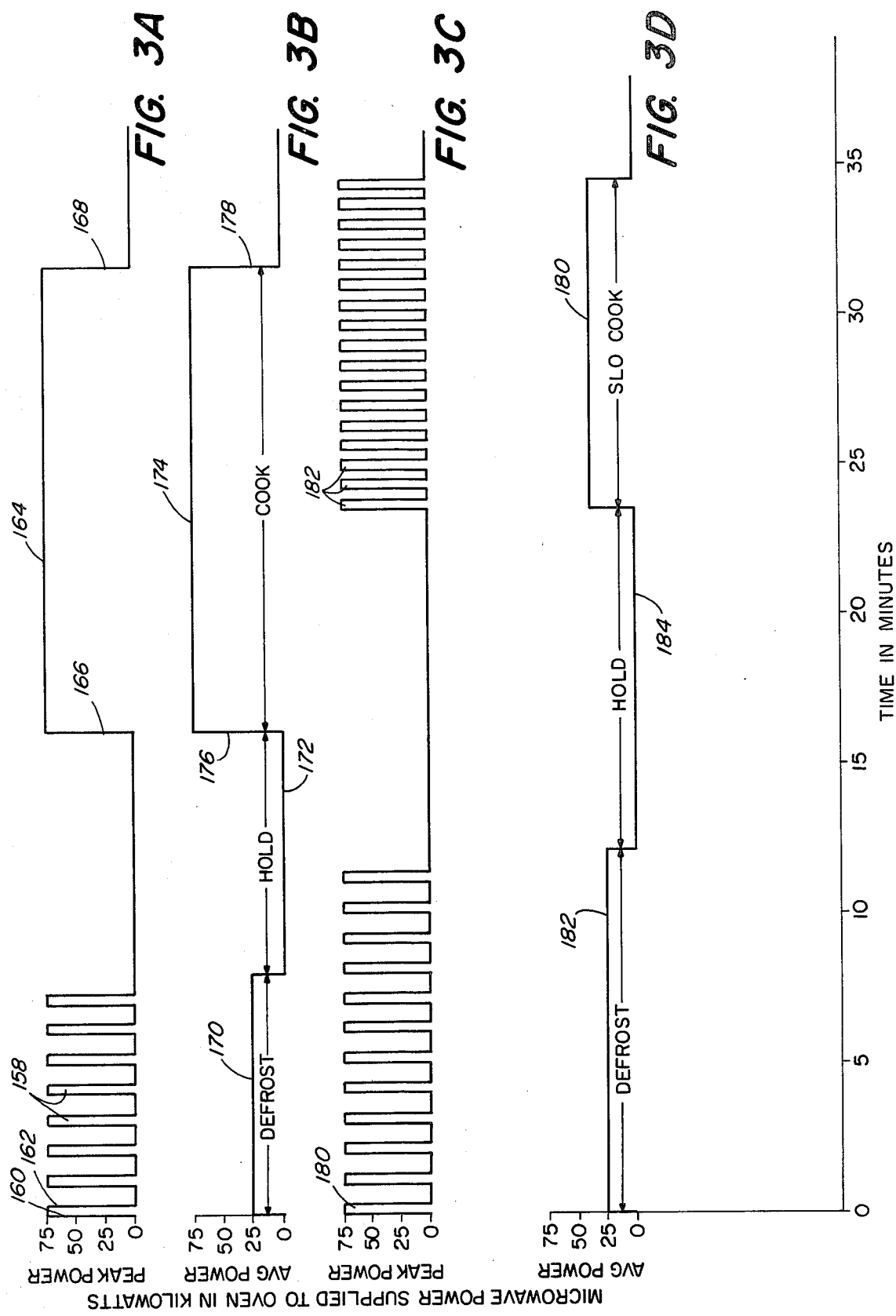

DIGITALLY PROGRAMMED MICROWAVE COOKER

CROSS-REFERENCE TO RELATED CASES

This is a continuation of application Ser. No. 671,468, filed Mar. 29, 1976, now abandoned.

BACKGROUND OF THE INVENTION

Digital programming of various functions such as industrial processes or resistance heating of conventional electric stoves is known. However, such devices do not have the same fail-safe requirements as microwave cookers. For example, prevention of excess electromagnetic radiation is a problem with conventional electric stoves and, hence, conventional digitally controlled sequences of control circuits may be used.

Microwave cookers, however, for example of the type shown in copending application Ser. No. 479,379 filed June 14, 1974 by Richard A. Foerstner, required that a frozen or partially frozen food body be cooked with a time sequence. A timer is manually reset a number of times to apply the microwave energy and to then allow the food body to set for a period to transfer heat by conduction to those portions of the food body which absorb less microwave energy due, for example, to having ice crystals formed therein which have a lower loss at the microwave frequency of 2.45 KMH predominantly used for microwave cooking. Attempts to avoid the necessity for manually resetting the timer at the end of each application of defrosting microwave energy have been tried, for example, by providing additional mechanical timers which are interconnected by additional relay contacts to produce various sequences of operation, but such devices have proved expensive and have required additional switch contacts which can be a source of maintenance.

SUMMARY OF THE INVENTION

In accordance with this invention, fail-safe mechanical switch systems are incorporated in the digitally controlled power circuitry. Such switch systems are normally actuated prior to the flow of current therethrough and, accordingly, such switches do not switch against current with attendant arcing or sparking.

More specifically, sequencing of the power on and off is achieved in accordance with this invention by digitally controlled semiconductor switches such as thyristors to control an alternating current signal supplied to a power supply such as the primary of a high voltage transformer which energizes a source of microwave energy such as a magnetron whose output is supplied to a cooking cavity. Mechanical switches actuated by a closure member for an access opening to said cooking cavity are connected directly in series with said semiconductor switch and a power source so that power cannot be supplied to the power supply in the event that the door is open. In addition, means are provided for sensing the position of the mechanical interlock switches to disable the semiconductor switch in the event that the door is open and one of the mechanically actuated switches sticks closed. More specifically, a latch interlock switch and a first interlock switch have additional contacts thereon connecting an open door sensing component through a second interlock switch and a thermal sensing structure to the ground side of an input power line so that power cannot be supplied to the transformer.

This invention further provides time sequencing of the microwave power by a computer which is manually programmed by touching pads on a front panel to select a program in said computer. The selected cycle, such as a defrost cycle, a defrost and cooking cycle, or a cooking cycle, is fed from the output from said computer to a power relay system for applying energy to a power supply such as a transformer providing high voltage to a microwave generator such as a magnetron.

This invention further provides that the power relay system is preferably a semiconductor structure, such as a thyristor, so that no mechanical contacts are opened or closed to switch power to the magnetron on and off since door interlock and safety protection switches have all been actuated prior to actuation of the semiconductor power relay by the computer.

This invention further provides that the computer may consist of a large number of computer functions, the majority of which are formed on a semiconductor chip or chips as an integrated or hybrid circuit requiring low input control power and, hence, easily accentuated from capacitive pads on a front panel board having a plurality of different pads thereon which are labeled in accordance with the time and desired defrost mode to be selected. Preferably, the panel indicates the mode or cycle which has been selected and/or the time for each mode of the food processing sequence.

BRIEF DESCRIPTION OF THE DRAWINGS

Other and further objects and advantages of the invention will become apparent as the description thereof progresses, reference being had to the accompanying drawings wherein:

FIGS. 3A through 3D illustrate diagrams of digitally programmed timing sequences for the system of FIG. 2.

DESCRIPTION OF THE PREFERRED EMBODIMENT

Figure 1:
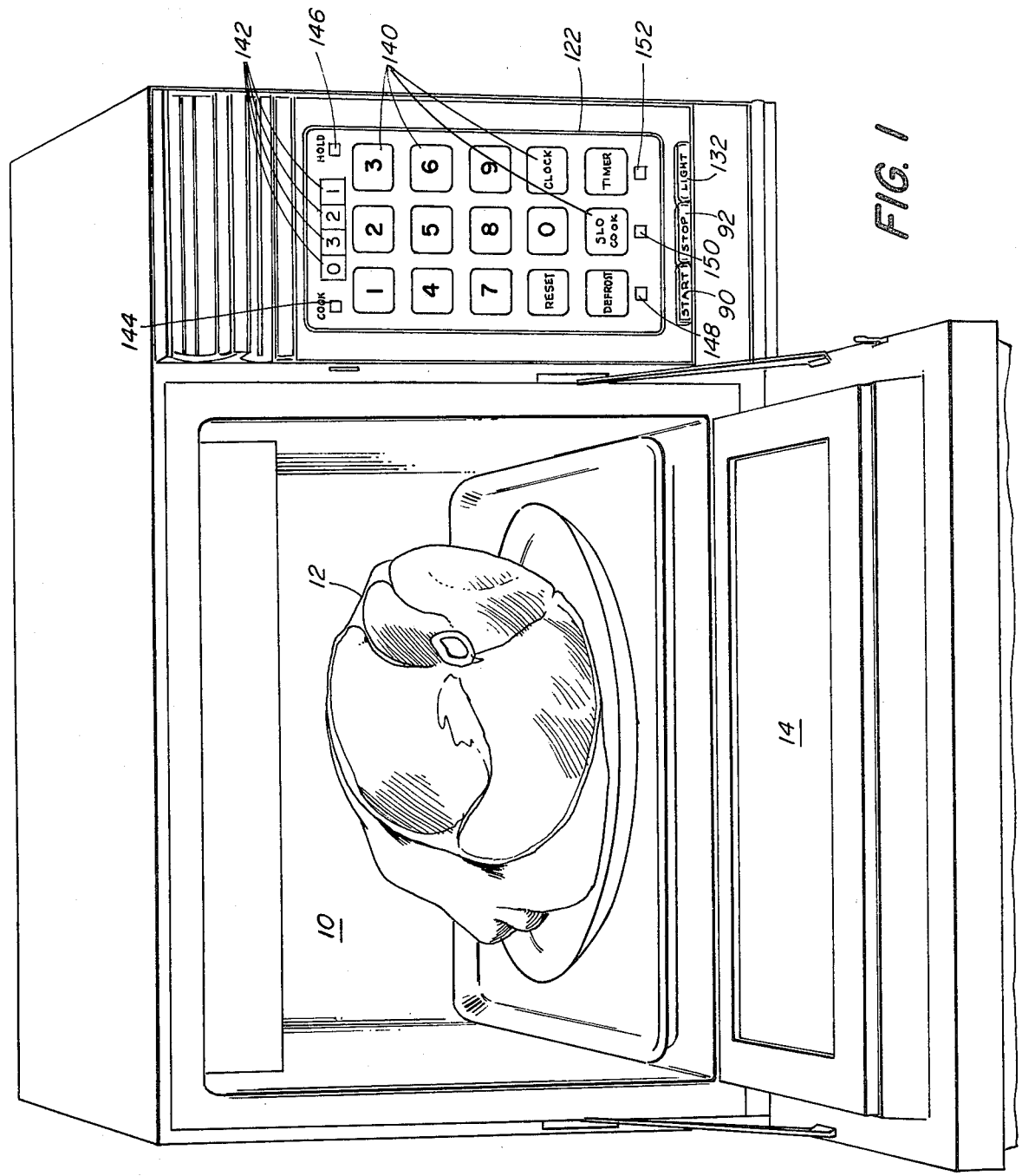
FIG. 1 illustrates a front elevation view of a microwave oven incorporating the invention.
Figure 2:
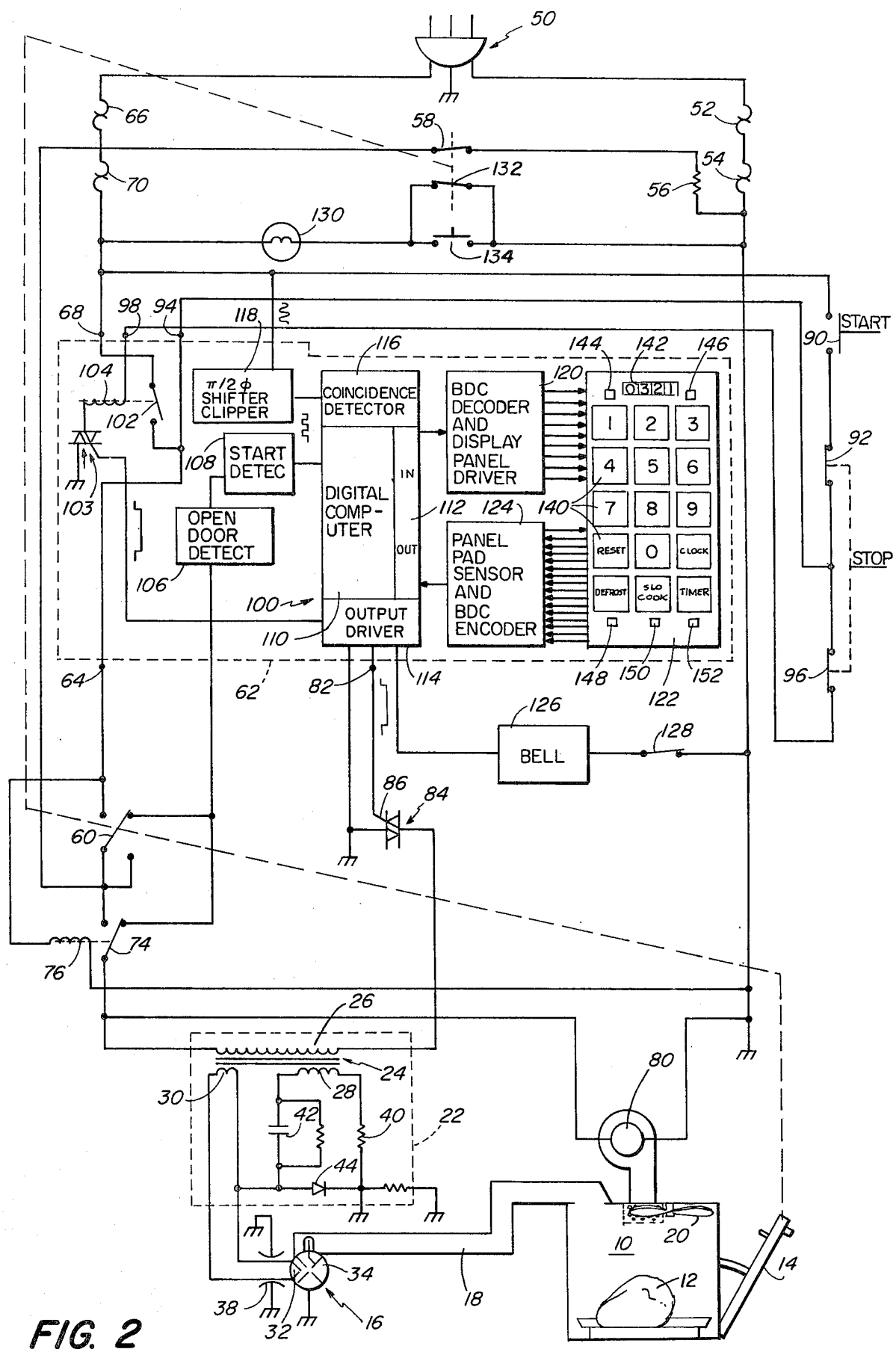
FIG. 2 illustrates a schematic diagram of the control system in this invention.

Referring now to FIGS. 1 and 2, there is shown a microwave oven cavity 10 having a food body 12 positioned therein through a door 14 supplied with microwave energy from a magnetron 16 via a waveguide 18. While the magnetron 16 may generate microwave energy of any desired frequency, a frequency of 2.45 KMH is preferred. The cooking cavity 10 has internal dimensions which are many times the free space wavelength of said frequency so that many different resonant modes may be produced therein, and such modes may be cyclically distributed by a mode stirrer 20 driven by any desired means in accordance with well-known practice.

Magnetron 16 is supplied with power at a voltage of, for example, 4000 volts from a high voltage power supply 22 comprising a transformer 24 having a primary winding 26, a high voltage secondary winding 28 and a filament winding 30. Filament winding 30 is connected to the filament 32 of the magnetron 16 whose anode 34 is grounded, and any spurious oscillations emanating from the magnetron 16 via the leads to the cathode 32 are suppressed by capacitors 38. The high voltage winding 28 has one end connected to ground through a current sensing resistor 40 and to filament winding 30 through an energy storage condenser 42 to one side of magnetron filament 32. A half wave rectifier 44 is connected from ground to the same side of the filament 32 as the condenser 42, with the rectifier 44 being poled such that when the ungrounded end of winding 28 is positive, current flows through rectifier 44 to charge condenser 42, and when the voltage across winding 28 reverses, filament 32 is driven negative to cause conduction of magnetron 16, partially discharging condenser 42. Operation of such a high voltage circuit for magnetron power supplies is shown in greater detail in U.S. Pat. No. 3,396,342 in which the transformer is preferably selected to have saturation characteristics at the maximum desired voltage to at least partially compensate for changes in the input voltage level to the primary winding and/or different secondary load conditions occurring, for example, during warm-up or throughout the life of the magnetron.

Power is supplied to input winding 26 from a conventional 110 volt 60 cycle source to a plug 50. One side of plug 50 is connected to one side of a thermally actuated element 52 which is heated by the resistor 40 so that in the event excess current is drawn by the magnetron 16 or other elements of the power supply 22 for more than a predetermined time, thermal energy generated by resistor 40 will cause element 52 to open thereby de-energizing the circuit. The other side of element 52 is connected to one side of a similar thermally actuated element 54, and the other side of element 54 is connected through a resistor 56 which is adjacent to element 54 and which will transfer heat thereto if current flows through resistor 56 when the oven is energized. The other end of resistor 56 is connected through an interlock switch 58 actuated by the door 14 and opened when the door 14 is closed. The opposite terminal of switch 58 from that connected to resistor 56 is connected to a second interlock switch 60 actuated by door 14. When the door 14 is closed, switch 60 contacts terminal 64 of control circuit 62.

The other side of the plug 50 from that connected to protection element 52 is connected to one side of a thermally actuated protection element 66 mounted on, or adjacent to, the anode 34 of magnetron 16 and adapted to open if the temperature of magnetron 16 exceeds a predetermined temperature. The other side of element 66 from that connected to the plug 50 is connected to a power input terminal 68 of control 62 through a protection element 70 located adjacent to and sensing the heating cavity 10. Control circuit 62 connects terminal 68 to terminal 64 when it is desired to energize the transformer 24 to supply microwave energy to the oven. The terminal 64 is connected to one end of transformer primary winding 26 through interlock switch 60 and a latch switch 74 mechanically actuated by a latch solenoid 76 which prevents the door 14 from being opened when solenoid 76 is energized. Solenoid 76 is connected between the grounded bus connected to thermal element 54 and terminal 64.

A blower motor 80 is connected between the grounded bus and the junction between latch switch 74 and winding 26 so that when motor 80 is energized by the circuit 62, the blower supplies cooling air to the magnetron 16 and also to the cavity 10 to turn a fan-shaped mode stirrer 20 rotatably supported on a shaft.

The end of winding 26 opposite to that connected to switch 74 is connected to ground through a semiconductor switch 84 such as a triac having a control electrode 86 to which a control signal is supplied from a terminal 82 of control circuit 62 when it is desired to energize transformer 24.

To initiate operation of the circuit, a normally open start button 90 is pushed to momentarily connect terminal 68 through a normally closed contact of a stop button 92 to a terminal 94 of circuit 62. Terminal 94 is connected through a second normally closed section 96 of the stop button, mechanically ganged to section 92, to a terminal 98 of circuit 62 which actuates a relay in circuit 62 having a set of normally open contacts 102 actuated by a solenoid 104. Contacts 102 when closed supply power from terminal 68 to terminal 64 which energizes latch solenoid 76 and supplies power through interlock switch 60 and latch switch 74 to the ungrounded end of winding 26.

The position of the left interlock switch 60 and the latch interlock switch 74 is detected by additional contacts on those switches which are contacted by those switches when the door 14 is opened and the interlock switch 58 is closed, as shown in FIG. 2, thereby supplying a ground potential to an open door detect circuit 106 in control circuit 62. The output of circuit 106 prevents operation of a start detector circuit 108 supplied from terminal 94 when door 14 is open.

Upon pushing of the start button 90 with door 14 closed, power is supplied to latch solenoid 76, closing latch 74 and opening the contact of latch 74 connected to the circuit 106. The door 14 is then locked shut, and, since interlock switch 60 has been actuated to remove the ground from door detect circuit 106, a start signal is supplied to a digital computer 100 in circuit 62 which actuates relay solenoid 104 through a triac 103, closing relay contacts 102 to bypass the start button 90 thereby holding latch solenoid 76 energized until the program sequence of computer 100 ends, at which time solenoid 104 is de-energized, opening contacts 102, de-energizing latch solenoid 76 and permitting the door to be opened. Power to solenoid 104 is also interruptable by pushing ganged stop buttons 92 and 96.

From the foregoing, it may be seen that even upon failure of the digital computer circuit 100, the semiconductor switch 84 or the semiconductor switch 103, the oven once energized cannot be opened to produce radiation leakage until power is removed from the latch solenoid 76 which, under these circumstances, is directly in parallel with the input to the transformer 26. Accordingly, with such a circuit, multiple programming may be achieved using semiconductor circuitry while still retaining the fail-safe conditions of the mechanical interlock structures required by safety standards.

Digital computer 100 can be any general purpose digital computer having sufficient memory to retain the desired program and may be located either on the oven or, if desired, may be a central computer for a commissary supplying the cooking control programs. A special purpose computer could also be used with the particular digital components preferably selected from standard digital components in which large numbers of circuits having different functions are formed on a semiconductor chip and/or a plurality of semiconductor chips or formed on a substrate and packaged as a unit. It is also contemplated, however, that any of the conventional digital techniques employing core logic, bipolar semiconductor logic or MOS logic may be used.

Digital computer 100 is shown herein by way of example as having a digital computing section 110 which performs memory functions, programming functions, sequencing control functions and, for example, contains a master oscillator clock which may have a frequency of 100 KHz. A second section of the computer 100 is the display input and output section 112 which supplies data from the computer section 110 to a binary to a digital code display panel driver 120. The output of driver 120 provides light actuating signals to a plurality of regions 144 of display 122 indicating cooking functions and digital code to four locations on a four-position number display 142 which are connected to the appropriate number signals at unit 142.

Input program data signals, which are produced by touching panel pads 140 of display panel 122, are sensed by a panel pad sensor and binary to decimal encoder 124 which supplies a level sensing signal to all the pads 140. The sensed pad causes data identifying the pad in digital form to be sent to section 112 of the computer 100.

An output drive section 114 of computer 100 energizes the semiconductor switches 106 and 86 as well as a bell alarm 126 to indicate the end of the cycle. Alarm 126 may be de-energized by means of a switch 128, if desired.

A section 116 of computer 100 is a coincidence detector to which a square wave input is supplied from a phase shifter clipper 118 supplied with a 60 cycle sine wave voltage from terminal 68. The output signal from phase shifter clipper 118 which is a sine wave clipped to form said square wave is preferably delayed by 90° or $\pi/2$ radians, and is supplied to coincidence detector 116 where it is compared with clock pulses from section 110 to energize switch 84 through section 110 and output section 114 only when a positive going excursion of the wave from phase shifter clipper 118 appears and to de-energize switch 84 only when a negative excursion of the output of phase shifter clipper 118 occurs so that the phase shift of the alternating current supplied the transformer 26 during the start-up and shutdown of the transformer is accurately controlled. The precise phase shift is preferably chosen to minimize input current to the transformer and depends upon the transformer design and the value of the condenser 42. In the design selected for optimum operation, condenser 42 discharges at least partially during the portion of the 60 cycle wave when the rectifier 44 is nonconducting and magnetron 16 is conducting. Under these conditions, values are chosen such that a phase shift of 90° of the phase shifter clipper 118 produces substantially reduced starting current surges to the power supply 22 thereby reducing peak currents which might otherwise damage interlock switches or blow fuses and reduces power line interference to radios or television sets.

The de-energization of the transformer 24 only during a negative going excursion of the output of phase shifter clipper 118 insures the residual flux in the transformer 26 will be in the reverse direction from that produced by starting current and, hence, the possibility that the transformer will be driven into saturation and drawing large peak currents during start-up due to residual transformer core flux during repeated start-up program sequences is avoided.

A light 130, positioned in oven cavity 10, is energized by switch 132 ganged to switch 58 to turn on light 130 when door 14 is open. If desired, an auxiliary switch 134 may be manually closed to turn light 130 on during cooking when door 14 is closed to observe the oven interior through a transparent glass over apertured metal in the front of door 14.

Display 122 as shown in FIG. 2 is a flat glass panel having touch pads indicated at 140 for numbers and cooking functions, a digital read-out section 142 and individual lights 144 for cook, 146 for hold, 148 for defrost, 150 for slo cook, and 152 for timer. The panel 122 is thus cleanable easily and does not attract dirt and grease from cooking activities.

The pads 140 are actuated by touching with a finger which reduces the level of a carrier signal having a frequency of from 30 to 300 KHz supplied by encoder 124 through pads 140 to level detectors in encoder 124 connected through separate lines to each of the pads 140. Each particular pad level detected causes a read-only memory in encoder 124 to send a digital code to the digital computer 100, coded with the identity of the pad sensed, which stores the code of the number or function.

Referring now to FIGS. 3A and 3B, there is shown a time sequence illustrating an example of defrosting and cooking a food body using sequential operations programmed into the computer 100. Time in minutes is shown on the diagram for defrosting and cooking a food body such as a roast of beef. FIG. 3A illustrates the waveform output from the computer 100 controlling the switch 84. FIG. 3B shows the waveform of the average microwave power program selected for a defrosting and cooking sequence.

To implement the defrost and cook sequence, body 12 is put in the oven 10 and the door 14 is closed, supplying power from one side of the line through the interlock switch system at the fan 80 and a side of the transformer primary winding 26. The defrost pad 140 is then touched supplying a level detector signal to encoder 124 to store the defrost function digital code in the memory of computer 100. A number, such as 0800, is sequentially supplied by touching the pads 0, 8, 0 and 0 thereby storing the time of 8 minutes and 0 seconds for the defrost function in the computer. The second function to be carried out is then programmed into the computer. For example, the cook function is selected by touching pads 140 corresponding to the desired cook time, such as 1, 5, 3 and 0, to select the time of 15 minutes and 30 seconds.

The start button 90 is then pressed and power is supplied to the transformer 24 energizing magnetron 16 to deliver microwave energy to the oven 10. As shown in FIG. 3A, a pulse 158 is supplied from computer driver 114 having a leading edge 160 synchronized with a pulse of the computer clock and at the peak positive potential of the 60 cycle alternating current supplied to plug 50 to start magnetron 16. After producing microwave energy for 20 seconds, magnetron 16 is turned off by the trailing edge 162 of pulse 158 at the peak negative excursion of the alternating current voltage to the current plug 50. After a wait of 40 seconds, pulse 158 reoccurs to re-energize transformer 24 and again supply microwave energy to the oven 10. This function cycle continues for the time selected for defrost so that the microwave energy is supplied to the oven as bursts of energy having a duty cycle of one-third. At the end of the 8-minute time period selected for defrost, the computer 100 automatically resets to hold the magnetron off for the same time programmed for defrost.

The curve 3B shows the average microwave power in the oven for the control program of FIG. 3A. Since during the defrost function duty cycle the power is in one-third of the time, the average power is shown at 170 as one-third of the full power of 700C watts. The periods of wait between pulses of microwave power permit portions of the food which have absorbed more energy from the microwave field in the oven than adjacent regions thereof to transfer the energy by conduction to such adjacent regions to melt, for example, ice crystals in the body. During the subsequent hold period 172 with no microwave energy supplied to the oven, thermal gradient throughout the food body levels still more to insure, for example, that small portions of the roast 12 are defrosted.

During the cook time period 164 as shown in FIG. 3A, the microwave energy is turned on at time 166 and off at time 168, resulting in full average microwave power being supplied to the oven, as shown in FIG. 3B, in region 174 beginning at point 176 and ending at point 178. Following expiration of the cooking cycle, computer 100 supplies a signal to the alarm 126 and de-energizes the relay solenoid 104 by de-energizing the input to triac 103, which removes power from solenoid 76 and permits the door 14 to be open. In addition, the fan 80 is de-energized stopping the mode stirrer 20. The sequentially processed food body 12 may be then removed from the oven 10 by opening the door 14.

Alternatively, if a defrost and slow cook program is desired, the defrost pad 140 is touched and time pads touched. For example, as shown in FIG. 3C, to produce 12 minutes of defrost, the pads 1, 2, 0 and 0 are touched, the slo cook pad is touched and the slow cook time of, for example, 11 minutes and 30 seconds is selected by touching the pads 140 for 1, 1 3 and 0.

Start button 90 is pressed and, as shown in FIG. 3C, 20-second on pulses 180 separated by 40-second off periods are supplied to the computer by switch 84. During this 12-minute period, a digital code sent through driver 120 lights area 148 labelled defrost. Following expiration of the defrost period, an automatic repeat of the time is supplied by the computer with no pulses supplied the switch 84 so that body 12 in the oven is allowed to set for the same number of seconds as defrost with the area 146 labelled hold being illuminated. Pulses 182 are then supplied to switch 84 for the cook function for 11½ minutes. This produces the average microwave power in the oven shown by curve 3D by portions 182, 184 and 186 for defrost, hold and slo cook, respectively.

This completes the description of the embodiments of the invention disclosed herein. However, many modifications thereof will be apparent to persons skilled in the art without departing from the spirit and scope of the invention. For example, any desired form of display media, such as those used in minicomputers, can be used, and any desired microwave generator, power supply or digital computer circuitry can be used. Accordingly, it is intended that this invention be not limited to the particular details illustrated herein, except as defined by the appended claims.

What is claimed is:

1. A microwave heating system comprising:
    means comprising a magnetron for supplying microwave energy to a multimode cavity having a movable closure member;
    a power supply for said magnetron;
    means for supplying power to said power supply from an alternating current source comprising a switch mechanically actuated by closure of said movable closure member;
    means comprising a semiconductor switch connected in series with said mechanically actuated switch for controlling the supply of power to said magentron from said power supply in sequences of different average microwave power levels comprising means for pulsing the supply of power to said magnetron at different pulse repetition rate duty cycles;
    said controlling means further comprising a clock having a frequency substantially higher than the frequency of said power source; and
    means for manually selecting at least one of said different pulse repetition rate duty cycles.

2. The system in accordance with claim 1 wherein:
    said means for controlling said power comprises means for generating trains of control pulses as a pulse repetition frequency lower than said power source.

3. The system in accordance with claim 2 wherein:
    control of said microwave power levels comprises control of the duty cycle of said control pulses.

4. The system in accordance with claim 1 wherein said control system comprises a digital computer.

5. A microwave heating system comprising:
    a microwave energy generator supplying microwave energy to a multimode cavity to convert said microwave energy to heat in a body positioned therein; and
    a digitally controlled power supply energizing said microwave generator in a sequence producing a first average microwave power level by pulsing said microwave generator at a first repetition rate duty cycle for a first time period, producing a substantially different average microwave power level by pulsing said microwave generator at a different pulse repetition rate duty cycle for a second period of time, and producing a third average power level above said first power level by pulsing said microwave generator for a third period of time.

6. The system in accordance with claim 5 wherein:
    the clock frequency of said digital control system is substantially greater than the frequency of said power source.

* * * * *